United States Patent
Tortel et al.

(10) Patent No.: US 8,893,746 B2
(45) Date of Patent: Nov. 25, 2014

(54) OBTURATOR VALVE FOR A COUPLING DEVICE FOR PIPES

(75) Inventors: Damien Tortel, Champvallon (FR); Cécile Pastel, Sens (FR); Renaud Le Devehat, Fleurigny (FR)

(73) Assignee: FMC Technologies SA, Sens (FR)

( * ) Notice: Subject to any disclaimer, the term of this patent is extended or adjusted under 35 U.S.C. 154(b) by 97 days.

(21) Appl. No.: 13/381,528

(22) PCT Filed: Jun. 29, 2010

(86) PCT No.: PCT/IB2010/052966
§ 371 (c)(1),
(2), (4) Date: Dec. 29, 2011

(87) PCT Pub. No.: WO2011/001377
PCT Pub. Date: Jan. 6, 2011

(65) Prior Publication Data
US 2012/0138834 A1    Jun. 7, 2012

(30) Foreign Application Priority Data

Jun. 29, 2009 (FR) ..................... 09 54430

(51) Int. Cl.
| F16L 37/367 | (2006.01) |
| F16K 5/06 | (2006.01) |
| F16K 51/00 | (2006.01) |
| F16K 5/20 | (2006.01) |
| F16K 1/24 | (2006.01) |

(52) U.S. Cl.
CPC .. F16K 1/24 (2013.01); F16K 5/204 (2013.01)
USPC .................. 137/614.01; 137/315.19; 251/314

(58) Field of Classification Search
USPC .......... 137/614.04, 613, 614, 614.01, 614.02, 137/614.03, 1, 315.19; 251/305–308, 314, 251/315.01
See application file for complete search history.

(56) References Cited

U.S. PATENT DOCUMENTS

| 3,065,950 | A | | 11/1962 | Goldberg |
| 3,276,474 | A | * | 10/1966 | Gill .......................... 137/614.03 |
| 5,099,883 | A | | 3/1992 | Maiville |
| 7,334,773 | B2 | * | 2/2008 | Stout et al. .................... 251/294 |
| 2004/0124392 | A1 | | 7/2004 | Lucas |
| 2007/0228314 | A1 | | 10/2007 | Geiser |

FOREIGN PATENT DOCUMENTS

| SU | 524952 | 8/1976 |
| WO | WO 96/25618 | 8/1996 |

* cited by examiner

*Primary Examiner* — Kevin Lee
*Assistant Examiner* — Michael R Reid

(57) ABSTRACT

A valve (2) is concerned comprising an obturator (16) maintained in a resting position against a seat (14) through the action of a first force generated by pre-loading means (38), further comprising means (28) for rotating the obturator (16) to place the valve in an open or closed position, characterized in that the valve comprises means (26, 40) for translating the obturator to move the obturator (16) such that a gap (j1) is created between the obturator (16) and the seat (14), the translating means being adapted to drive the obturator (16) to move in translation independently of the rotational movement of that obturator (16).

15 Claims, 6 Drawing Sheets

OBTURATOR VALVE FOR A COUPLING DEVICE FOR PIPES

BACKGROUND OF THE INVENTION

The present invention relates to a obturator valve and a device for coupling pipes in which at least a first pipe to be coupled is provided at one end with a obturator valve.

In this type of device, it is known to drive in rotation a obturator arranged in the valve, the obturator could have the form of a disc or a sphere, setting the obturator in rotation making the valve correspond to an open position, enabling the fluid to go through, or to a closed position. As an example, when the obturator is a sphere, a flow channel is arranged inside the sphere, and in the open position of the valve, the flow channel enables the fluid to go through on the axis of the valve, whereas in the closed position, the flow channel is oriented across the fluid passage, and blocks the latter.

The obturator rests, in a known manner, on a seat formed in the body of the valve. This contact allows the valve to be sealed, and it is known to keep this contact constant, no matter the position of the valve, open or closed, on the one hand by the pressure of the fluid coming against the obturator, and on the other hand, by the pressure exerted continuously by a pre-loading spring. Sealing is thus provided at both strong and low fluid pressures, the force of the pre-loading spring replacing the fluid pressure in the latter case. Such a provision has however the drawback, which is to require a substantial coupling, when the obturator is being set into rotation, to tear said obturator away from the seat. This can cause the obturator or the seat to wear off more quickly, depending on the materials used for one and the other.

The device disclosed in the document EP0564564 also has this drawback. In this document, a sphere has a flat sealing surface, substantially coplanar to the end coupling plane of the valve. The purpose of this document is for the ball to not extend outside of the valve chamber when the sphere rotates. To this end, a cam is arranged on the sphere and cooperates with a cam structure arranged inside the valve chamber. It is the rotation of the sphere which causes the cam to move along the cam surface. The sphere therefore starts rotating before the action of the cam, the rotation causing the translational motion. At the time the rotation is starting, the sphere is therefore invariably pre-loadingly supported against the seat, and the previously mentioned drawbacks arise.

SUMMARY OF THE INVENTION

The invention aims at proposing a obturator valve for a device for coupling pipes which makes it possible to solve the previously mentioned drawbacks, while preserving optimal sealing.

To this end, the object of the invention is a obturator valve for a device for coupling pipes, comprising at least one chamber, a flow passage which extends inside the chamber, and a obturator placed in the flow passage, the obturator resting on a seat in a first resting position and being maintained in this position against the seat by the intermediary of the first force generated by the pre-loading means, and comprising also means for setting the obturator into rotation so that the obturator can be set in rotation between an open position of the valve inside which a fluid can flow, and a closed position in which the fluid is blocked, characterized in that the valve comprises means for setting the obturator into translation, to displace the obturator from said first position against the seat to a second position in which a gap is created between the obturator and the seat, able to drive the obturator in a translational motion independently from the rotational displacement of this obturator.

The fact that the translational displacement is independent from the rotational displacement of the obturator enables the use of a valve in which the obturator can be set in rotation at a later, distinct time, whereas a gap has already been created between the obturator and the seat. This also allows for simultaneously proceeding with the rotating and the translating, without a time-lag between the translating and the rotating, from which it depends.

Such a device advantageously allows to preserve a tight sealing between the obturator and the seat formed in the body of the valve, when the passage of the fluid is blocked, and to switch from an open position of the valve to a closed position without wearing off the obturator or the seat, and with no oversizing of the means for setting the obturator in rotation. Advantageously, the force exerted by the pre-loading springs can, on the contrary, be increased to enhance the sealing of the device without increasing the wear mentioned hereinabove.

According to different characteristics, particular to the invention, which can be combined together:

- the obturator is rotationally mounted in at least one obturator support, the pre-loading means translationally biasing said at least one obturator support, and the translating means being adapted to generate a second biasing force according to a direction, opposite from the first force generated by the pre-loading means, to cause the displacement in translation of the at least one obturator support against said pre-loading means;
- the pre-loading means comprise at least a straight spring taking support on a section of the at least one obturator support;
- the translating means are adapted to be biased by a second valve brought against said obturator valve;
- the translating means comprise at least a pushing rod which can slide in the body of the chamber of the valve, the translating means being arranged so that the pre-loading means, the at least one obturator support and the at least one push rod being aligned in this order;
- the at least one push rod has a tubular portion, which extends in an bore formed in the chamber of the valve, the axial dimension of the tubular portion being greater than the axial dimension of the bore, so that in the first position an end of the tubular position projects outside the valve adapted to be biased by a second valve, brought against said obturator valve, and so that in the second position, said end of the tubular portion is flush with a coupling end of the valve, the push rod extending inside the chamber, forcing the obturator support against the pre-loading means;
- the translating means comprise at least one actuator and an actuation element, said actuating element being positioned in the chamber in the vicinity of the obturator, the actuating element being adapted to translationally biase the obturator;
- the translating means comprise at least a linear actuator and a rod forming the actuation element, the free end of the rod being provided with a catch affixed in translation to the obturator support, the actuator being adapted to pull the obturator support toward said actuator, against said pre-loading means, the actuator being positioned on the same side of the obturator support than the pre-loading means;
- the translating means comprise at least one rotary actuator and a cam forming the actuation element, the rotation of the at least one cam being able to drive the translation of the obturator against said pre-loading means, the cam being positioned so that the pre-loading means, the at least one obturator support and the at least one cam are aligned in this order;

thermal insulation means are arranged between the body of the actuator and the outside of the valve;

two translating means are symetrically arranged on either side of the obturator with respect to the flow passage;

the obturator has a least one planar surface, forming a shoulder with a cylindrical portion radially extending toward the outside of said obturator, an oblong slot being made in the cylindrical portion;

the means for setting the obturator into rotation comprise a control axis, adapted to cooperate with the cylindrical portion of the obturator;

a pin formed at a first end of the control axis is housed in the oblong slot, the length of said slot being longer than the corresponding dimension of the pin of the control axis in order to provide a displacing gap of the control axis with respect to the obturator, and the width of the slot being adjusted to the corresponding dimension of the pin;

the obturator support is formed by a spacer arranged in the vicinity of the cylindrical portion of the obturator, opposite the planar surface, said obturator support being adapted to move axially by the action in one direction of the pre-loading means, and by the action in an opposite direction of the translating means.

Furthermore, the invention also has for an object a device for coupling pipes, in which at least one first pipe to be coupled is provided at one end with a obturator valve, such as described hereinabove, and in which the obturator valve comprises a coupling flange, this flange having toward the outside of the chamber at a coupling end forming a plane that is substantially perpendicular to the direction in which the flow passage extends.

According to different characteristics, the translating means can be biased by the contact of an element of the device distinct from the valve, brought against the coupling end of the valve.

The means for setting into translation a first valve can be actuated by the contact of the coupling end of the other valve, whereby the coupling end pushes on the projecting tubular portion of the push rods. Alternatively, the projecting tubular portions of the push rods of a first valve are set into translation by the contact with the projecting tubular portions of the push rods of the other valve.

Another object of the invention is a method for coupling pipes, at least one pipe comprising a obturator valve, in which the obturator rests on a seat and is maintained against this seat by the intermediary of a first force generated by pre-loading means, the obturator rotation allowing for switching from an open position of the valve in which a fluid can flow to a closed position in which the fluid is blocked, characterized in that the coupling method comprises at least the following steps:

translating the obturator, in a direction opposite to that of the first force generated by the pre-loading means, to obtain a gap between the obturator and the seat, and;

rotating the obturator, said obturator and the seat not being in contact when the obturator is set into rotation, due to the gap.

According to a characteristic if the invention, in the open position of the obturator, the gap is maintained between the obturator and the seat.

Other particularities and advantages of the invention will appear through the description with reference to the attached drawings.

DETAILED DESCRIPTION OF THE INVENTION

Figure 1:
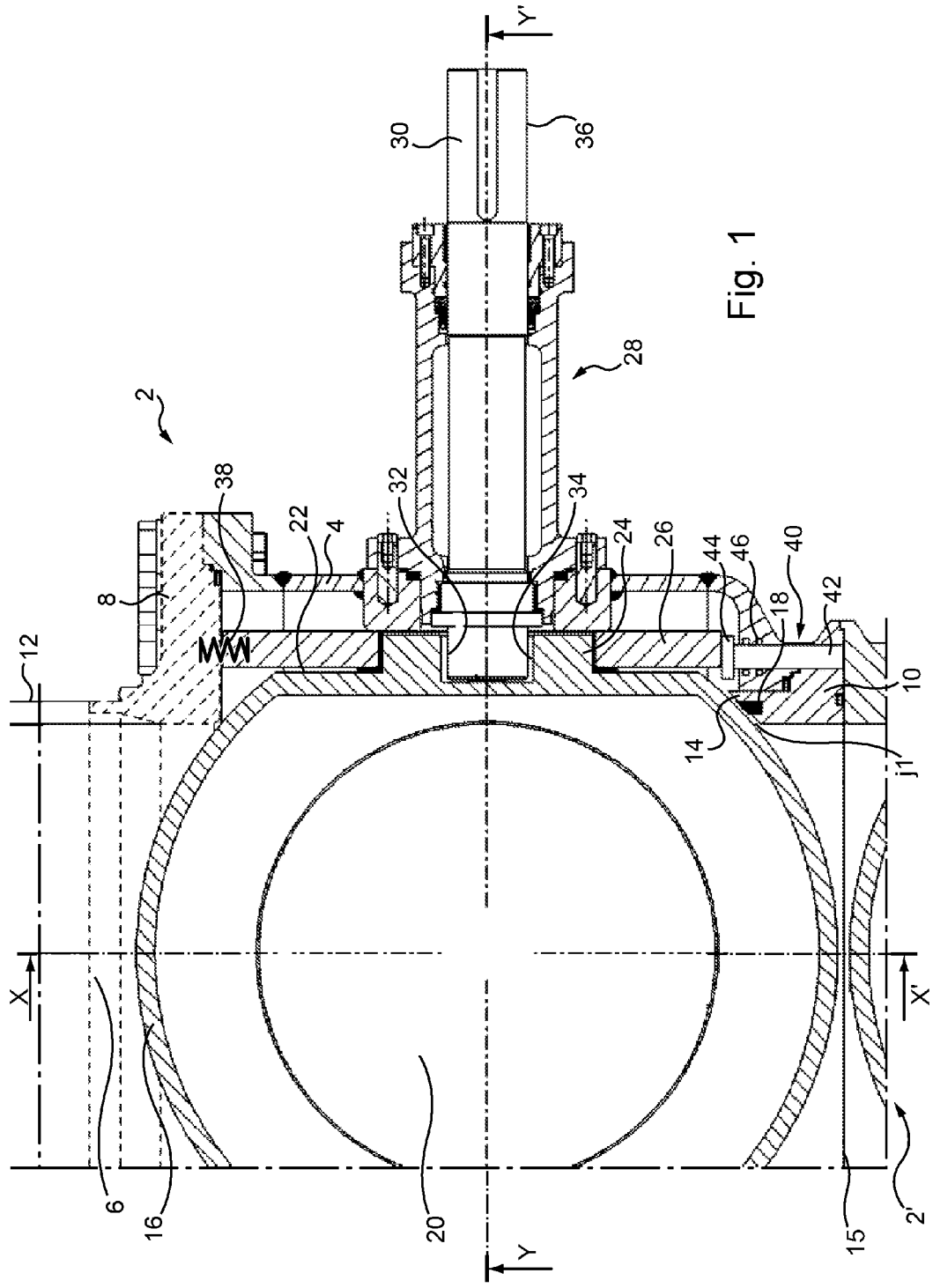
FIG. 1 is a partial, longitudinally cross-sectional top view of a valve for a coupling device according to the invention, in a first coupling position.

The coupling device shown in FIGS. 1 to 5 comprises at least one obturator valve 2, adapted to block and/or allow the passage of a fluid of a hydraulic pipe toward another.

The valve 2 is formed by a chamber 4 whose body defines a flow passage 6, which extends inside the chamber 4 along a first longitudinal axis X-X'. According to this first longitudinal axis X-X', the chamber 4 of the valve 2 has at a first end a connecting flange 8 and at a second end a coupling flange 10, the flow passage 6 inside the chamber 4 connecting the two flanges 8, 10.

The connecting flange 8 is affixed to the chamber 4, extends substantially transversely to said chamber, and has a connecting end adapted to enable a hydraulic pipe 12 to be mounted.

The coupling flange 10 is affixed to the chamber 4 and forms a seat 14 inside the chamber. As an example, in the embodiment shown, the seat 14 takes the shape of a cone portion. The coupling flange 10 has toward the outside of the chamber 4 a connecting end 15 forming a plane that is substantially perpendicular to the first longitudinal axis X-X' of the flow passage 6.

The valve 2 comprises also a obturator 16 placed in the flow passage 6.

According to the embodiment shown, the obturator 16 has a substantially spherical shape adapted to come in contact with the seat 14 formed by the coupling flange 10. A sealing ring joint 18 fitted in the seat 14 allows for this contact between the seat 14 and the obturator 16 to be sealed.

The obturator 16 has a flow channel 20 formed by a bore through the obturator 16 along an axis.

Furthermore, the obturator 16 has at least one planar surface 22 forming a shoulder with a cylindrical portion 24 radially extending said obturator 16 toward the outside of the latter. The obturator 16 is oriented in the chamber 4 of the valve 2 so that the planar surface 22 extends substantially parallel to the first longitudinal flow axis X-X'.

This planar surface 22 formed on the outer surface of the obturator 16 and the cylindrical portion 24 cooperate with a obturator support 26 and means 28 for setting the obturator into rotation.

The rotating means 28 are affixed to the obturator 16 so that the obturator 16 can turn around a second transverse axis Y-Y', perpendicular to the axis of the channel 20 and to the first longitudinal axis X-X', between an open position, in which the flow channel 20 is positioned on the first longitudinal axis X-X' of the flow passage 6, enabling the fluid to pass through, and a closed position in which the flow channel 20 is substantially perpendicular to the axis of the flow passage 6, blocking the passage of the fluid.

To this end, the rotating means 28 are formed by a control axis 30 which extends along the second transverse axis Y-Y', substantially perpendicular to the first longitudinal axis X-X', and which is rotationally mounted in the chamber 4 of the valve. The control axis 30 can drive the obturator 16 into rotation. A pin 32 formed at one end of the control axis 30 cooperates with an oblong slot 34 made in the cylindrical portion 24 of the obturator 16. The length of said oblong slot 34 is greater than the corresponding dimension of the pin 32 of the control axis 30 in order to allow for a displacing gap of the control axis 30 with respect to the obturator 16. The central position of the control axis 30, where the pin 32 is in the middle of the oblong slot 34, corresponds to an arrangement of the valve 2 in which the axis Y-Y' passes through the center of rotation O of the obturator 16. This central position shown in FIGS. 1, 4, and 5, makes it possible to drive the obturator 16 into rotation without stress. It will be understood that, in the vicinity of this position, the setting into rotation of the obturator is possible, but that positioning the obturator in this central position facilitates the setting into rotation of said obturator. The width of the slot 34 is adjusted to the corresponding dimension of the pin 32 of the control axis 30, to allow for the obturator 16 to be immediately set into rotation when the control axis 30 turns.

Means, which are not shown, in relation to the second end 36 of the control axis 30, generate the rotation of the control axis 30 around the second transverse axis Y-Y', and the rotation associated with the obturator 16 about the same transverse axis Y-Y'.

The obturator support 26 is arranged in the chamber 4 forming the valve 2, takes the shape of a rectangular spacer, and is pierced with a hole whose diameter corresponds to the diameter of the cylindrical portion 24 of the obturator 16. The support 26 is arranged around the cylindrical portion 24 opposite the planar surface 22. The obturator 16 is thus rotationally mounted in the support 26, according to the rotation axis Y-Y' of the control axis 30.

The obturator support 26 can move axially in the direction of the first longitudinal flow axis X-X', by the action in a direction of the pre-loading means 38, and by the action in a direction opposite to that of two push rods 40. To this end, the pre-loading means 38 and the push rods 40, associated with the obturator support 26, are aligned in the direction of the first longitudinal axis X-X'.

Here, the pre-loading means 38 are formed by two straight springs each housed in a first end of a bore (not shown for simplification purposes) made in the connecting flange 8 and which axially extend in the direction of the first longitudinal axis X-X' of the valve 2. The other end of the springs 38 is housed in the bores made in a section of the obturator support 26, located opposite the connecting flange 8.

Each push rod 40 extends axially in the direction of the first longitudinal axis X-X' of the valve, in a bore formed in the coupling flange 10 and in the chamber 4 of the valve 2. The rod 40 has a tubular portion 42 extending in said bore, and a pushing head 44 which can cooperate with a section of the obturator support 26. The axial dimension of the tubular portion 42 of the push rod 40 is greater than the axial dimension of the bore, so that when the pushing head 44 is taking support against the body of the chamber 4, the opposite end of the rod 40 projects outside the valve. Sealing joints are provided around said tubular portion 42 in the chamber 4 of the valve.

The operation of the valve and particularly the translating means will now be described.

In a resting position, the pushing head 44 takes support against an inner surface of the chamber 4 at one end of the bore, and the opposite end of each push rod 40 projects over the coupling end 15 of the valve 2. In this resting position of the push rod 40, the pre-loading means 38 push according to the first longitudinal axis X-X' the obturator support 26 toward the push rods 40, the obturator 16 then being pushed toward the seat 14. A gap can be arranged between the pushing head 44 and the obturator support 26.

In a work position, the end of each push rod 40 is flush with the coupling end 15 of the valve 2, and the pushing head 44 extends inside the chamber, at a distance from the inner surface of the chamber 4 and from the end of the bore. In this work position of the push rods 40, the push rods 40 push the obturator support 26 according to the first longitudinal axis X-X', toward the pre-loading means 38, the obturator 16 then being pushed opposite the seat 14, a gap j1 being formed between the obturator 16 and the seat 14.

It is in this work position, a given gap j1 formed between the obturator 16 and the seat 14, that the control axis 30 is in the central position in the oblong slot 34. The obturator 16 has been axially displaced and its center of rotation O is now on the axis of rotation Y-Y' of the control axis 30. It is therefore easy to make the obturator 16 turn from an open position to a closed position or from a closed position to an open position.

The displacing of the push rods 40 is limited in translation, in a direction by the contact of the head 44 with the body of the chamber 4, and in the other direction by the contact of the head 44 with the obturator support 26, the displacement of the obturator support 26 being limited because it is biased by the pre-loading spring 38.

The first force of the pre-loading springs 38 tends to push the obturator support 26 toward the coupling flange 10 and thus to place and maintain the obturator 16 into position against the seat 14 of the valve, whereas a compressive force on the end of the push rods 40 tends to push the obturator support 26 toward the pre-loading springs 38, and thus to move the obturator 16 away from the seat 14, contrary to the first force generated by the pre-loading springs 38, by creating the gap j1 between the obturator 16 and the seat 14.

The valve 2 therefore has means 26, 40 for setting the obturator 16 into translation, comprising at least one push rod 40 and a obturator support 26, and which tend to set the obturator 16 into translation by generating a second axial force, greater than first force generated by the pre-loading means 38 and directed toward a direction opposite that of this first force. Furthermore, said translating means 26, 40 are distinct from the rotating means 28 formed in particular by the control axis 30, so that the axial translational displacement of the obturator generated by the translating means are made independently from the rotational displacement of this obturator generated by the rotating means. A translational displacement of the obturator can be carried out without rotation, and conversely, setting the obturator into rotation can be carried out in a determined axial position of the obturator.

A device for coupling pipes according to the invention comprises at least one pipe 12 provided at one end with a valve 2 such as described hereinabove. The translating means 26, 40, are pushed inside the chamber when said valve 2 is coupled with another valve 2' or any other element of the coupling device which flattens against the coupling end 15 of the valve 2. As an example which is not shown, a distinct element of the coupling device could be an emergency disconnection system placed between the ends of the two valves.

Advantageously, the second pipe to be coupled is provided at its end with a valve 2' that is identical to that described hereinabove, and each one of the valves 2 and 2' to be coupled preferably has push rods 40 and 40' projecting from their coupling end 15 and 15'. The push rods 40 of the valve 2 can thus be pushed either by the coupling end 15' of the other valve 2', or by the push rods 40' of this other valve 2'.

To this end, coupling connectors (not shown), are arranged on the coupling flange to lock the coupling of the various elements of the device.

A method is now described, for the coupling and uncoupling of a obturator valve, such as previously described, and associated with a first pipe, a second valve 2' associated with a second pipe.

Figure 3:
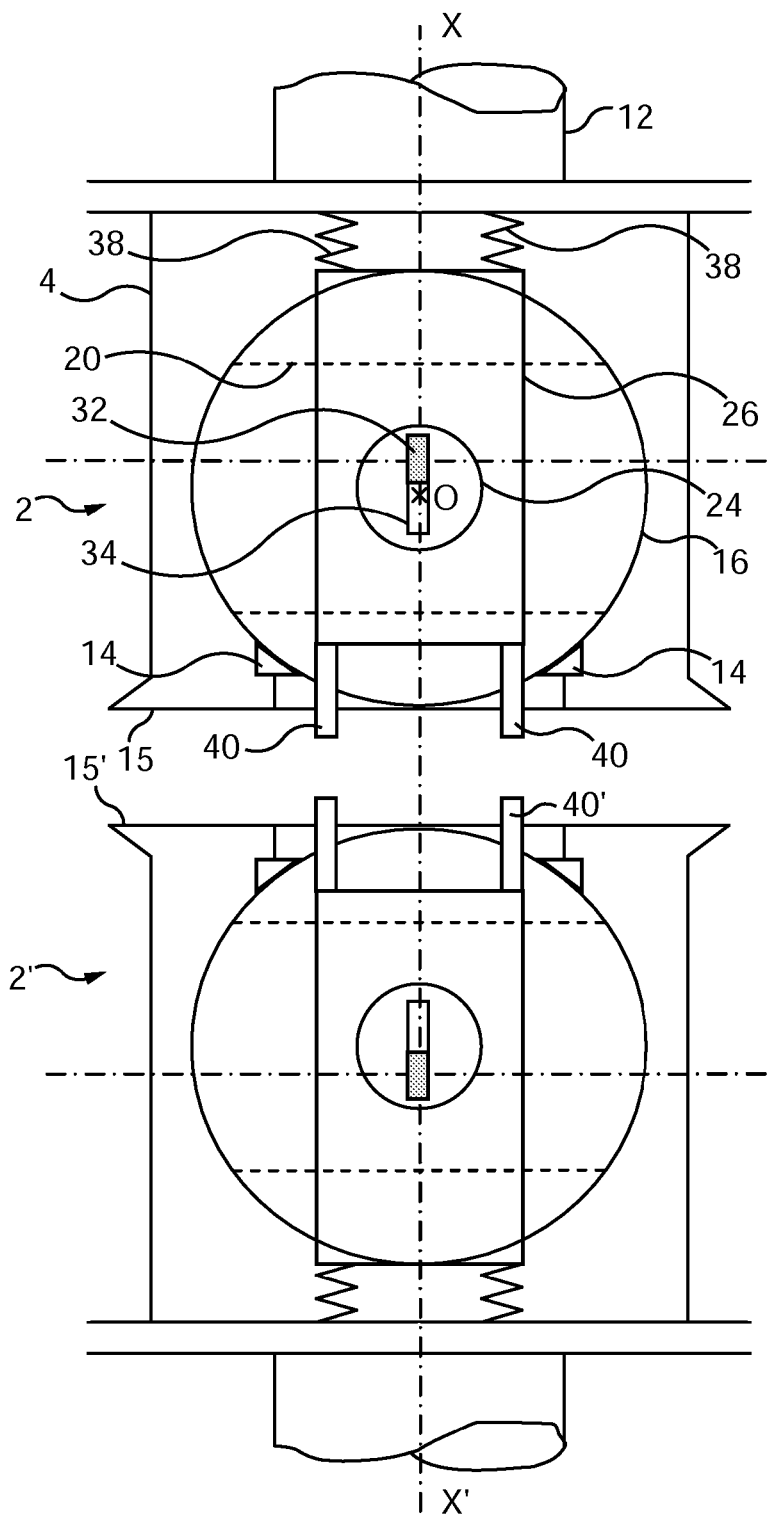
FIG. 3 is a side view of a device according to the invention, uncoupled.
Figure 4:
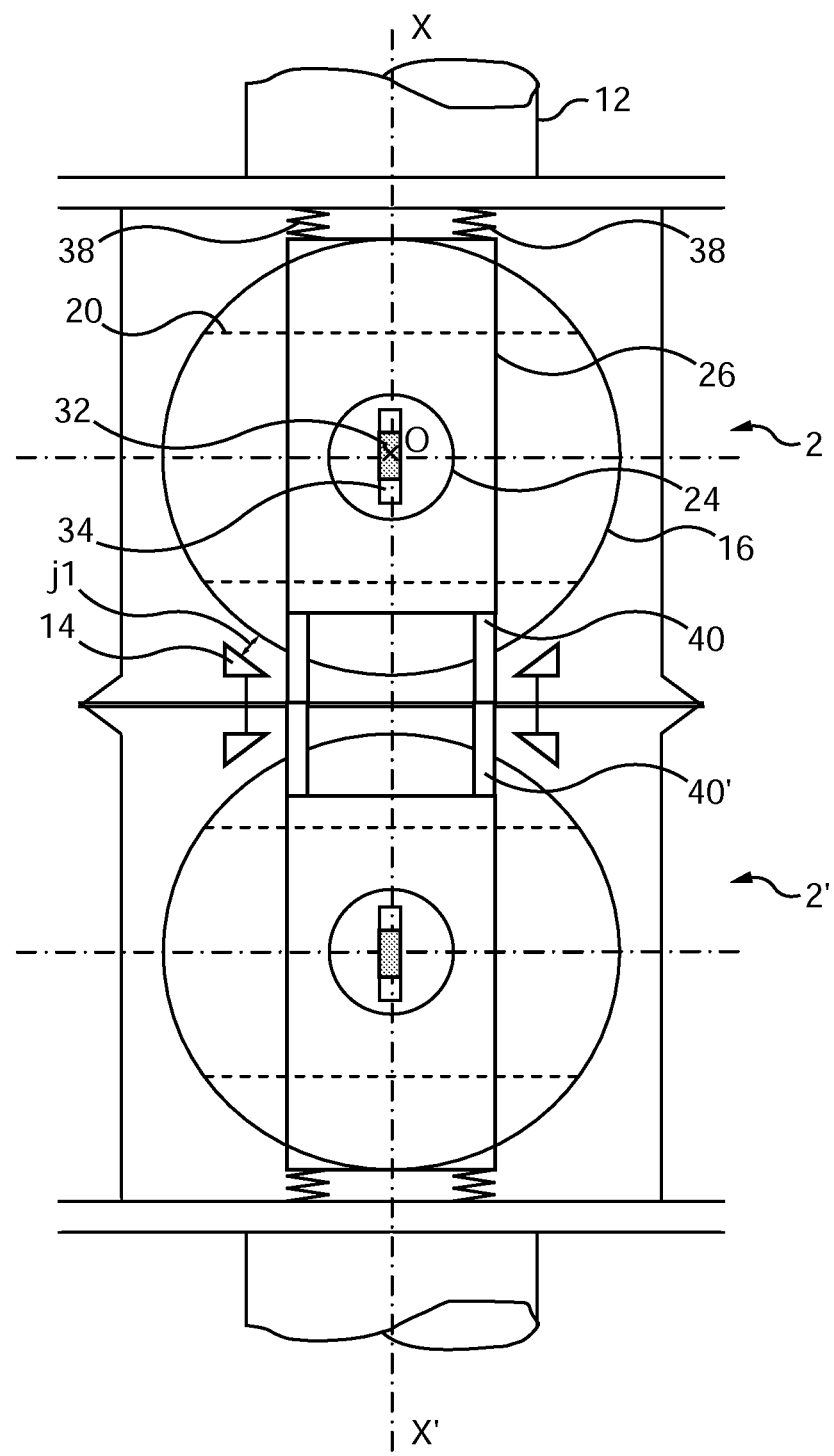
FIG. 4 is a side view of a device according to the invention, coupled, with a obturator valve in closed position.
Figure 5:
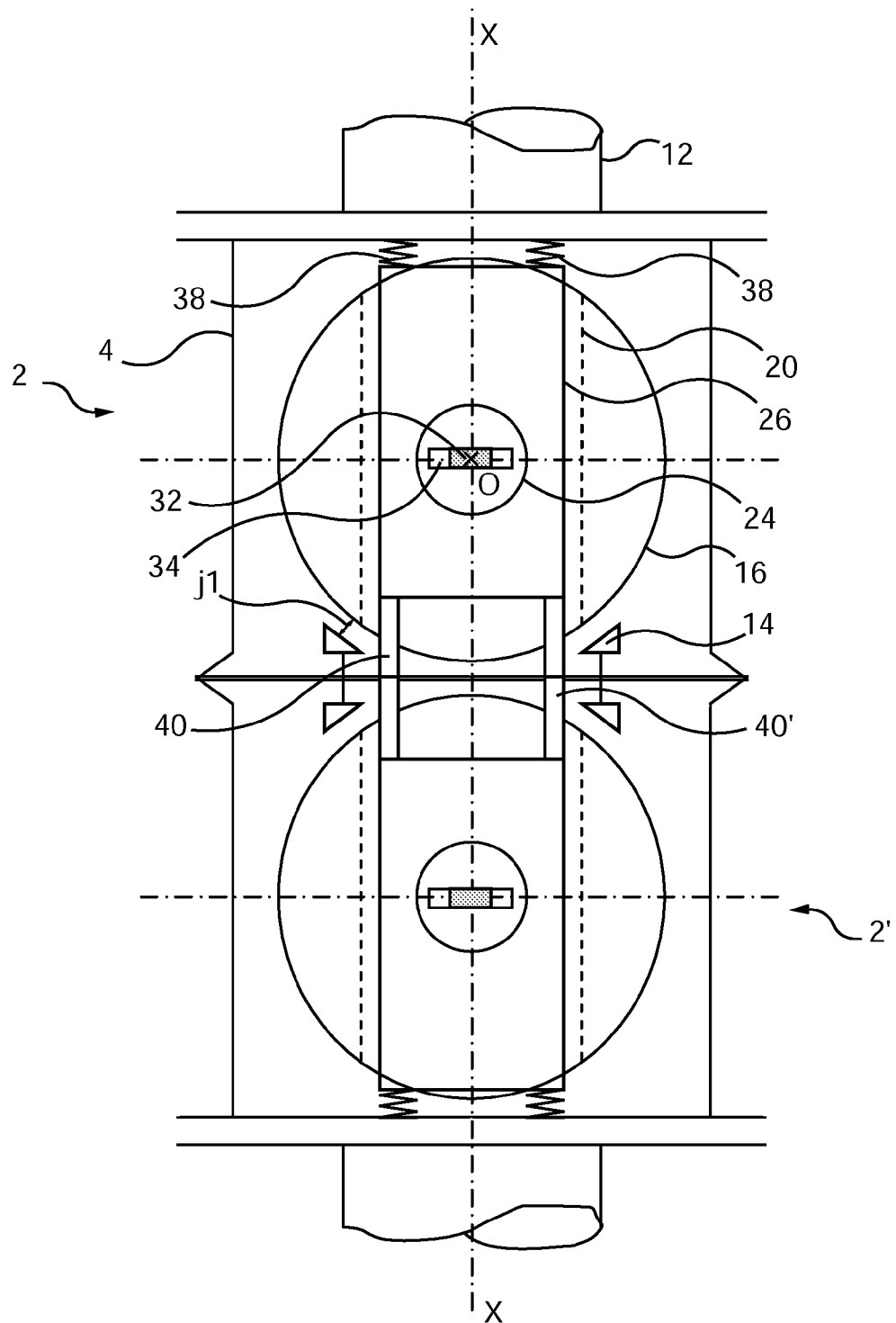
FIG. 5 is a view, equivalent to FIG. 4, of a device according to the invention, coupled, with a obturator valve in the open position.

Here, as shown particularly in FIGS. 3 to 5, the two valves are identical and the description hereinafter will therefore be limited to the states of the obturator valve associated with a first pipe.

When the assembly is uncoupled, the obturator 16 of the valve 2 is in the closed position, taking support against the seat 14, so that the fluid cannot come out of the first pipe 12. The sealing is optimal between the obturator 16 and the coupling flange 10, by a pressure carried out by the pre-loading springs 38. This state is shown particularly in FIG. 3.

For the fluid to pass from a first pipe 12 toward another one, the valve 2 according to the invention is connected to a second valve 2'. The latter pushes on the push rods 40, which project from the coupling end 15. The push rods 40 tend to get inside the body of the chamber 4 and to move axially against the force of the pre-loading springs 38, the force on the push rods 40 operated by the second valve 2' being greater than the pre-loading force operated by the springs 38. The displacement of the push rods 40 generates the displacement of the obturator support 26, and therefore of the obturator 16, toward the connecting flange 8. Therefore, there is no longer any contact with the seat 14. A gap j1 is created between the obturator 16 and the seat 14, and this gap j1 is dimensioned to enable the pin 32 of the control axis 30 to be in a central position in the oblong slot 34 made on the obturator 16. This state is particularly shown in FIG. 4.

The support of the rods 40 are carried out by the support 26 and not directly on the obturator 16. This results in a better equilibrium of the assembly. To this end, it is advantageous for the valve 2 to comprise two sets of push rods 40 bearing on two obturator supports 26 arranged on both sides of the obturator 16 with respect to the first longitudinal flow axis X-X'.

In the following step, whereas the gap j1 is maintained between the obturator 16 and the seat 14, and the pin 32 of the control axis 30 is maintained in its central position in the slot 34, the means for rotating the obturator 28 are actuated so as to rotate the obturator 16 in order for the channel 20 to let the fluid go through and for the valve 2 to become in an open position, shown particularly in FIG. 5.

It must be noted that, during the period of the fluid passage, the gap j1 is maintained and there is no contact between the seat 14 and the obturator 16.

When the valves need to be uncoupled, at the end of the hydraulic transfer process or in the context of an emergency procedure, one proceeds with rotating the obturator 16 to put the valve in a closed position, and then with separating the valves. The withdrawal of the second valve 2' means that the push rods 40 are no longer pushed inside the chamber 4, and, because of this, the obturator 16 and the corresponding support 26 are again subjected mostly to the force of the pre-loading springs 38. The obturator 16 and the support 26 are axially displaced up to the point where the obturator 16 is in contact with the seat 14. The uncoupled valve is thus sealed tight.

A second embodiment of the invention, shown in FIG. 6, will now be described, in this case a valve 102. The same numerical references as for the valve 2, increased by 100, are used for the elements that are similar.

The valve 102 is on the whole similar to the valve 2, except the translating means comprising the push rod 40 is replaced by a rod 140 mounted on a linear actuator 50; the fee end of the rod 140 being provided with a catch 52 affixed in translation to the obturator support 126.

The linear actuator 50, for example a pneumatic or hydraulic cylinder, contrary to the push rod 40, is not arranged in the vicinity of the seat 114, and is dimensioned to pull the obturator support 126 toward the connecting flange 108, against the first force of the pre-loading springs 138, so as to displace the obturator 116 from a first position against the seat 114 to a second position where a gap is created between the obturator 116 and the seat 114.

Figure 6:
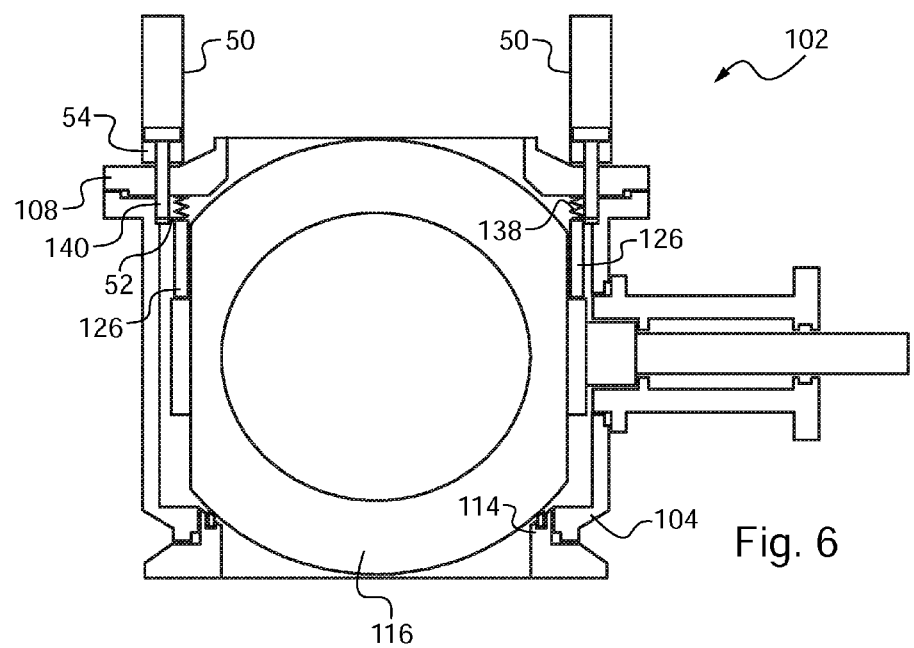
FIG. 6 is a top view of a coupling device according to a second embodiment.

The pneumatic or hydraulic cylinder 50 can be arranged entirely in the chamber 104 of the valve 102, or be arranged as shown in FIG. 6 outside the valve 102 with the rod 140 extending through the connecting flange 108. In the latter case, thermal insulation means 54 are arranged between the body of the cylinder 50 and the outside of the valve 102.

Alternatively, the shape of the obturator support 126 is different from that of the obturator support 26, the portion of the obturator support 26 opposite the coupling flange 10 in the first embodiment playing no part in said second embodiment in the translation of the obturator 116.

Control means, which are not shown, make it possible to actuate the hydraulic or pneumatic cylinder 50 and to cause the translational displacement of the obturator 116.

A third embodiment, that is, a valve 202 shown in FIG. 7, will now be described. The same numerical references, increased by 200, are used for the elements which are similar than for the valve 2.

The valve 202 is, on the whole, similar to the valve 2, except the translating means comprising the push rod 40 is replaced by a rotary cam 240 arranged at the end of a shaft 61 of a rotary actuator 60.

The rotary actuator 60 causes the cam 240 to rotate, supported against a cylindrical portion 224 of the obturator 216. In the position shown in FIG. 7, the cam 240 displaces the obturator 216 toward the pre-loading springs 238 so as to move the obturator 216 from a first position against the seat 214 to a second position where a gap is created between the obturator 216 and the seat 214. In a position which is not shown where the cam has turned 180°, the pre-loading springs 238 have translated the obturator toward the coupling flange 210 and toward the seat 214.

Figure 7:
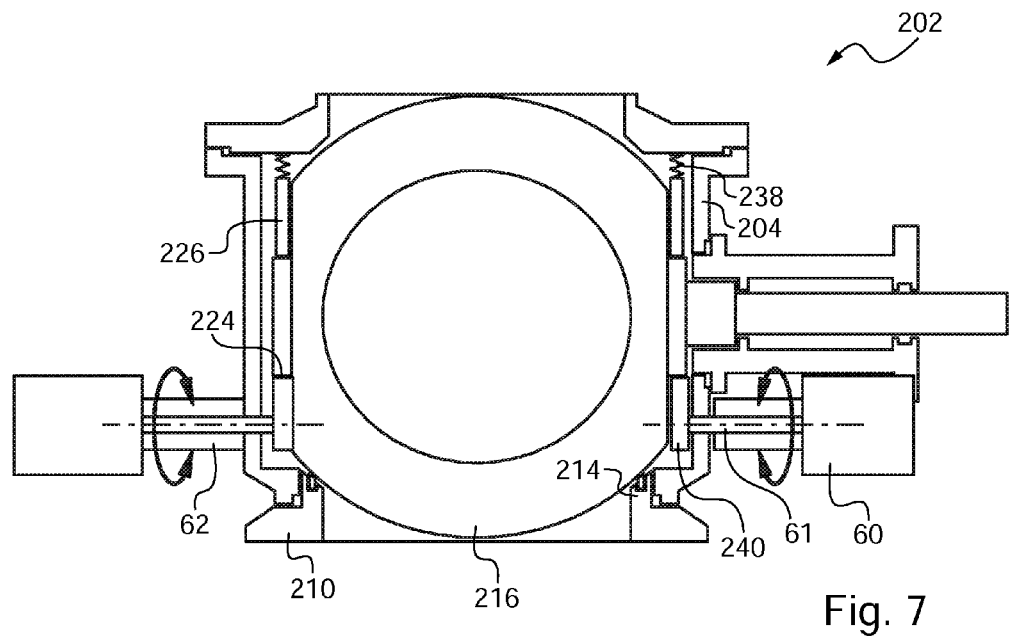
FIG. 7 is a top view of a coupling device according to a third embodiment.

The rotary actuator 60 can be arranged entirely in the chamber 204 of the valve 202, or be arranged such as shown in FIG. 7, outside the valve 202, with the shaft 61 of the actuator 60 extending through the chamber 204. In the latter case, thermal insulation means 62 are placed between the body of the rotary actuator 60 and the outside of the valve 202. In both cases, the cam 240 is positioned so that the pre-loading means 238, the obturator support 226, and the cam 240 are aligned in this order, the rotation of the cam 240 being able to drive the obturator 216 in translation against said pre-loading means 238.

As shown in FIG. 7, the obturator support 226 has a shape that is equivalent to the obturator support 116 of the second embodiment. However, the shape of the obturator support 226 can be the same as that of the obturator support 26, the rotary cam 240 thus taking support against a section of the obturator support or being housed in a corresponding depression in the obturator support.

Control means, which are not shown, make it possible to set the rotary actuator 60 in motion and cause the translational displacement of the obturator 216.

Using a obturator valve with translating means which can drive the obturator into translation independently from the rotation displacement allows an initial translation of the obturator before it is set into rotation, so as to prevent any tearing off of the obturator during rotating. The fact that, contrary to the state of the art, the translation operation is independent from the rotation operation makes it possible to achieve this result, even if the translation and rotation operations are simultaneously operated.

The translation and rotation steps of the obturator such as mentioned, which can be distinct and uncoupled, make it possible to ensure that there is little or no wear on the seat and sphere, due to the fact that the main resistance component when the rotation means act on the obturator to open the valve have been eliminated. The coupling of said means does not need to be dimensioned to prevent the tearing off of the obturator from its seat, and therefore can be downsized. All the auxiliary mechanisms can also be downsized.

Another advantage of uncoupling the translation and rotation steps is that the material forming the seat does not need to be as hard, which makes for an optimized sealing of the contact between the seat and the obturator.

According to the invention, the fluid goes through the flow passage in an open position of the valve, whereas the obturator is not in contact with valve seat.

The pre-loading force can thus be increased without having, as a result, to provide an additional coupling to the rotation means. The pre-loading increase can be quantified to ensure that the valves cannot open again once the system has been uncoupled. Such dimensioning can allow for doing without known means for preventing the reopening of the valves after disconnection, such as electric sensors, which detect the presence of the coupling, or a hydraulic abutment acting directly on the hydraulic circuit of the valve actuator.

Furthermore, the fact that the obturator and the seat are in contact only when the device is coupled and not continuously, can allow for a fundamental modification of the shape of the obturators, and for example of the spherical obturators which can have only one spherical portion, that is, the portion of the obturator which is in contact with the seat when the device is uncoupled.

Figure 2:
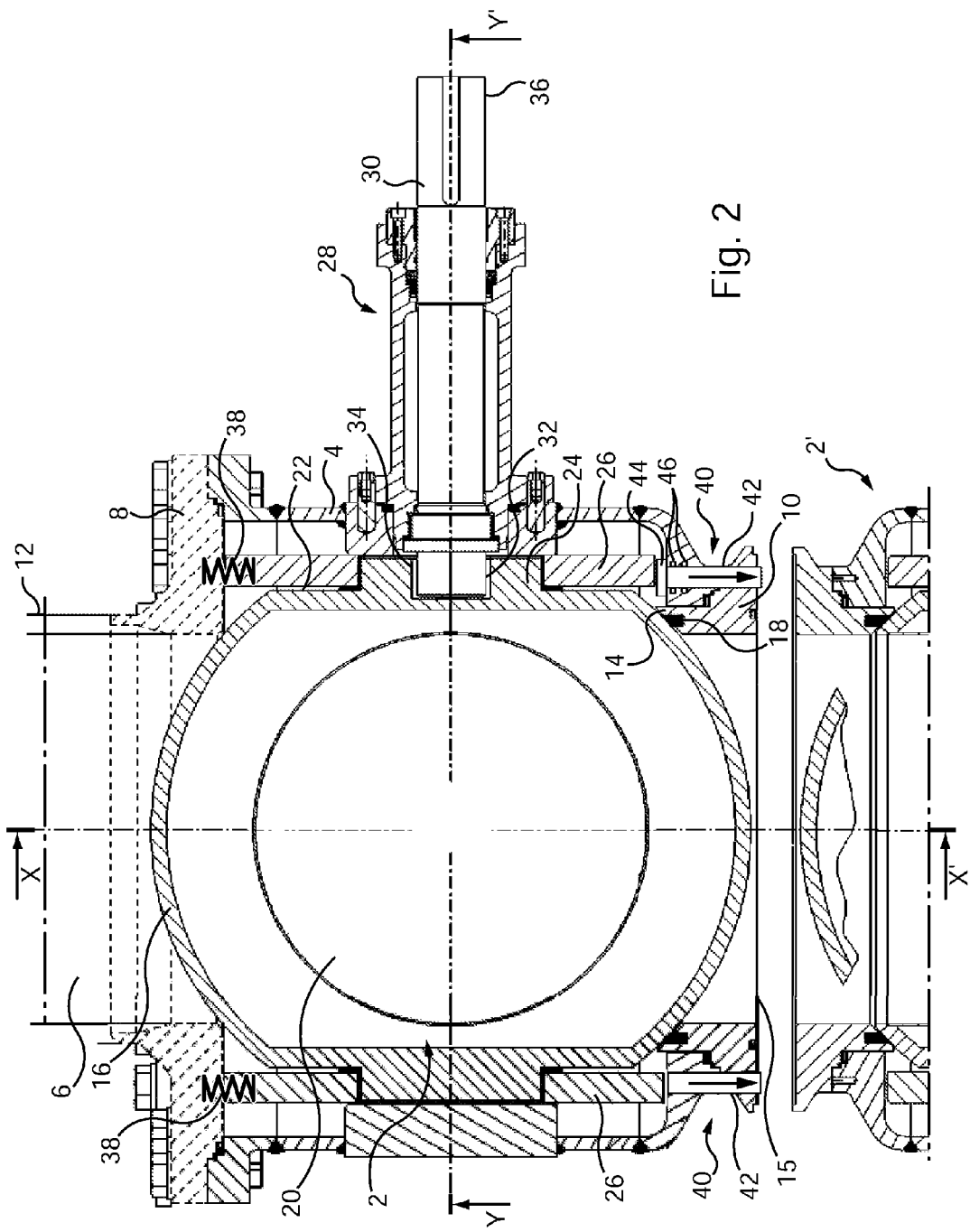
FIG. 2 is a cross-sectional view corresponding to FIG. 1, the coupling device being in a second uncoupling position.

However, such as shown in the drawings, it will be understood that the invention also has the advantage of being applicable to existing shapes of obturators and to varied and existing valve arrangements. By way of example for alternatives which are not shown:

the seat can be returned to the coupling flange and not molded with the flange, as shown in FIGS. 1 and 2; or the seat can have a profile that is distinct from the conical profile shown;

the number and the position of the push rods or of the pre-loading springs can vary. By way of example, a single pre-loading spring and a single push rod can displace a obturator support in translation. In an alternative, three springs and three push rods can be arranged in contact with a obturator support to displace it in translation;

the shape of the push rod can differ from the one previously described, and particularly by the lack of a pushing head 44 (FIG. 2). In this case, it is the push rod 40 and its end, arranged in the chamber of the valve, which biases the obturator support in translation against pre-loading means. This alternative is considered, in particular, when at least two push rods are provided for a obturator support, the stability of the pushing being thus provided;

the obturator can have any known shape, as long as translating means can displace it at a distance from the seat, and that rotating means allow it to switch from a flow position of the fluid to a position for blocking said fluid, the means for setting into translation being able, according to the invention, to be actuated independently from the means for setting into rotation.

the rotating means can be slidingly mounted on the chamber of the valve. Setting the obturator into rotation is then made possible no matter the axial position of said obturator.

Naturally, numerous modifications can be made to the examplary embodiment previously described without leaving the context of the invention.

The invention claimed is:

1. An obturator valve for a pipe coupling device which comprises:
    at least one valve housing;
    a flow passage which extends within the valve housing;
    an obturator which is located in the valve housing and which in a first position engages a seat positioned around the flow passage, the obturator being held in the first position against the seat through the action of a first force generated by a pre-loading means;
    means for rotating the obturator between an open position of the valve in which a fluid can flow through the flow passage and a closed position of the valve in which the fluid is prevented from flowing through the flow passage; and
    translating means for moving the obturator in translation from the first position against the seat to a second position in which a gap is created between the obturator and the seat;
    wherein the translating means is adapted to move the obturator in translation independently of the rotational movement of the obturator and the rotating means is adapted to rotate the obturator independently of the translational movement of the obturator.

2. An obturator valve according to claim 1, wherein the obturator is rotatably mounted in at least one obturator support which is engaged by the pre-loading means, and wherein the translating means is adapted to generate a second force in a direction opposite to the first force generated by the pre-loading means to cause the at least one obturator support to move in translation in opposition to said pre-loading means.

3. An obturator valve according to claim 2, wherein the pre-loading means comprises at least one helical spring which bears against an edge surface of the at least one obturator support.

4. An obturator valve according to claim 1, wherein the translating means is adapted to be actuated by a second valve which is brought into engagement with said obturator valve.

5. An obturator valve according to claim 2, wherein the translating means comprises at least one push rod which is adapted to slide in the valve housing, the translating means being disposed such that the pre-loading means, the at least one obturator support and the at least one push rod are aligned in that order.

6. An obturator valve according to claim 5, wherein the at least one push rod has a tubular part which extends in a bore formed in the valve housing, the axial dimension of the tubular part being greater than the axial dimension of the bore, such that in the first position an end of the tubular part projects from a coupling end of the valve, and in the second position said end of the tubular part is flush with the coupling end and the push rod extends within the valve housing and urges the obturator support in opposition to the pre-loading means.

7. An obturator valve according to claim 2, wherein the translating means comprises at least one actuator having an actuation member which is positioned in the housing in the vicinity of the obturator and is adapted to urge the obturator to move in translation.

8. An obturator valve according to claim 7, wherein the translating means comprises at least one linear actuator having a rod which forms the actuation member, the rod comprising a free end which is provided with a finger that is coupled in translation with the obturator support, the actuator being adapted for pulling the obturator support towards said actuator in opposition to said pre-loading means and being positioned on the same side of the obturator support as the pre-loading means.

9. An obturator valve according to claim 7, wherein the translating means comprises at least one rotary actuator having a cam which forms the actuation member, the rotation of the cam driving the obturator in translation in opposition to said pre-loading means, the cam being positioned such that the pre-loading means, the at least one obturator support and the cam are aligned in that order.

10. An obturator valve according to claim 1, wherein the translating means comprises two translating means which are symmetrically disposed on respective opposite sides of the obturator relative to the flow passage.

11. An obturator valve according to claim 1, wherein the obturator comprises at least one planar face, a cylindrical portion extending radially outwardly from the planar face, and an oblong slot formed in the cylindrical portion; wherein the rotating means comprises a control shaft adapted to cooperate with the cylindrical portion and a tenon formed at a first end of the control shaft and being accommodated in the oblong slot; and wherein the length of said slot is greater than the corresponding dimension of the tenon in order to allow a gap for movement of the control shaft relative to the obturator and the width of the slot is dimensioned to fit with the corresponding dimension of the tenon.

12. An obturator valve according to claim 11, further comprising at least one obturator support which is disposed in the vicinity of the cylindrical portion of the obturator facing the planar face, said at least one obturator support being adapted to be moved axially by the action in one direction of the pre-loading means and by the action in an opposite direction of the translating means.

13. A device for coupling pipes, an end of at least one of the pipes being provided with an obturator valve which comprises:
    a valve housing having a flow passage which extends therethrough;
    an obturator which is located in the valve housing and which in a first position engages a seat positioned around the flow passage, the obturator being held in the first position against the seat by a first force generated by a pre-loading means;
    means for rotating the obturator between an open position of the valve in which a fluid can flow through the flow passage and a closed position of the valve in which the fluid is prevented from flowing through the flow passage; and
    translating means for moving the obturator in translation from the first position against the seat to a second position in which a gap is created between the obturator and the seat;
    wherein the translating means is adapted to move the obturator in translation independently of the rotational movement of the obturator and the rotating means is adapted to rotate the obturator independently of the translational movement of the obturator.

14. A device for coupling pipes according to claim 13, wherein the obturator valve comprises a coupling having a coupling end forming a plane substantially perpendicular to the direction in which the flow passage extends, and wherein the translating means is actuated by contact with a member of the device distinct from the valve which is brought against the coupling end.

15. A device for coupling pipes according to claim 14, the device being adapted for the coupling of a first pipe and a second pipe, the first pipe being provided at one end with a first obturator valve and the second pipe being provided at one end with a second obturator valve, wherein the translating means of each of the first and second valves comprises a number of push rods, and wherein the push rods of the first valve are urged by contact with the push rods of the second valve to thereby move the obturator of the first valve from its first to its second position when the first and second valves are brought into engagement.

* * * * *